United States Patent [19]

Kakazu et al.

[11] Patent Number: 5,329,612
[45] Date of Patent: Jul. 12, 1994

[54] RULE FITNESS DETERMINATION, RULE REMOVAL, AND NEW RULE GENERATION

[75] Inventors: Yukinori Kakazu, 52-1, Bunkyodai, Ebetsu-shi, Hokkaido; Masaaki Minagawa, 6-6-20, 5-jou, Atsubetsu-chuou, Atsubetsu-ku, Sapporo-shi, Hokkaido; Kunihiko Unno, Kariya; Takao Yoneda, Nagoya; Masashi Yamanaka, Kariya, all of Japan

[73] Assignees: Toyoda Koki Kabushiki Kaisha, Kariya; Yukinori Kakazu, Ebetsu; Masaaki Minagawa, Sapporo, all of Japan

[21] Appl. No.: 858,491

[22] Filed: Mar. 27, 1992

[30] Foreign Application Priority Data

Mar. 27, 1991 [JP] Japan .................................... 3-90038
Mar. 27, 1991 [JP] Japan .................................... 3-90039

[51] Int. Cl.$^5$ ..................... B23Q 15/04; G11C 11/00
[52] U.S. Cl. .................................................... 395/75
[58] Field of Search ....................... 395/75, 76, 77, 900

[56] References Cited

U.S. PATENT DOCUMENTS 5,079,718  1/1992  Tanaka .................................. 395/75
5,189,728  2/1993  Yamakawa et al. ................. 395/900

*Primary Examiner*—Allen R. MacDonald
*Attorney, Agent, or Firm*—Oblon, Spivak, McClelland, Maier & Neustadt

[57] ABSTRACT

Disclosed is a processing apparatus capable of optimizing its rule base comprising a plurality of rules having an antecedent and a consequent each. The antecedent contains input conditions of machining, and the consequent describes the result of machining. The antecedents are applied to input condition data. The consequents of the applied rules yield machining result data that are evaluated for rule fitness. When the rule base is updated, some rules are deleted and some preserved depending on their degrees of fitness. Between given two rules having the same consequent, any number of corresponding conditional elements in their antecedents are exchanged so as to generate new rules. The process is repeated until the rule base is optimized. With the antecedents of rules applied to input condition data and with the consequents of the applied rules yielding machining result data, those data may be modified according to modification request data. The consequents of rules are applied to the modified machining data, and the antecedents of these applied rules furnish corrective input condition data. This backward application of rules is an easy way to obtain corrective input condition data.

5 Claims, 12 Drawing Sheets

FIG. 3

MACHINING CONDITION DATA

① ROUGH GRINDING ROTATIONAL SPEED
② FINE GRINDING ROTATIONAL SPEED
③ FINISH GRINDING ROTATIONAL SPEED
④ ROUGH GRINDING START SIZE
⑤ FINE GRINDING START SIZE
⑥ FINISH GRINDING START SIZE
⑦ ROUGH GRINDING FEED RATE
⑧ FINE GRINDING FEED RATE
⑨ FINISH GRINDING FEED RATE
⑩ POST-ROUGH GRINDING HALT TIME
⑪ POST-FINISH GRINDING HALT TIME

FIXED CONDITION DATA

⑫ GRINDING WHEEL MATERIAL
⑬ GRINDING WHEEL GRAIN SIZE
⑭ WORKPIECE MATERIAL
⑮ WORKPIECE RIGIDITY COEFFICIENT
⑯ WORKPIECE FINISH DIAMETER
⑰ WORKPIECE MACHINING ALLOWANCE
⑱ REQUISITION SIZE TOLERANCE OF WORKPIECE
⑲ REQUISITION SURFACE ROUGHNESS OF WORKPIECE
⑳ DESIGNATION OF SIZING MACHINING

MACHINING RESULT DATA

① SURFACE ROUGHNESS
② DIMENSIONAL ACCURACY
③ ROUNDNESS
④ CHATTER
⑤ BURNING
⑥ CRACK
⑦ GRINDING WHEEL DRESSING INTERVAL
⑧ VIBRATION

FIG. 4

RULE STRUCTURE

MACHINING CONDITION DATA IN ANTECEDENT

| ①ROUGH GRINDING ROTATIONAL SPEED | ②FINE GRINDING ROTATIONAL SPEED | ③FINISH GRINDING ROTATIONAL SPEED | ④ROUGH GRINDING START SIZE | ⑤FINE GRINDING START SIZE |
|---|---|---|---|---|
| ⑥FINISH GRINDING START SIZE | ⑦ROUGH GRINDING FEED RATE | ⑧FINE GRINDING FEED RATE | ⑨FINISH GRINDING FEED RATE | ⑩POST-ROUGH GRINDING HALT TIME |

FIXED CONDITION DATA

| ⑪POST-FINISH GRINDING HALT TIME | ⑫GRINDING WHEEL MATERIAL | ⑬GRINDING WHEEL GRAIN SIZE | ⑭WORKPIECE MATERIAL | ⑮WORKPIECE RIGIDITY COEFFICIENT |
|---|---|---|---|---|
| ⑯WORKPIECE FINISH DIAMETER | ⑰WORKPIECE MACHINING ALLOWANCE | ⑱REQUISITION SIZE TOLERANCE OF WORKPIECE | ⑲REQUISITION SURFACE ROUGHNESS OF WORKPIECE | ⑳DESIGNATION OF SIZING MACHINING |

MACHINING RESULT DATA IN CONSEQUENT

| ①SURFACE ROUGHNESS | ②DIMENSIONAL ACCURACY | ③ROUNDNESS | ④CHATTER | ⑤BURNING |
|---|---|---|---|---|
| ⑥CRACK | ⑦GRINDING WHEEL DRESSING INTERVAL | ⑧VIBRATION | | |

FIG. 6

RULE R    {[ ANTECEDENT              ] [ CONSEQUENCE           ]}
RULE R    {[ INPUT CONDITION DATA ] [ MACHINING RESULT DATA ]}

RULE $R_1$   {[$a_1(1)$, ..., $a_1(p)$] [$b_1(1)$, ..., $b_1(q)$]}
......
RULE $R_i$   {[$a_i(1)$, ..., $a_i(p)$] [$b_i(1)$, ..., $b_i(q)$]}
......
RULE $R_n$   {[$a_n(1)$, ..., $a_n(p)$] [$b_n(1)$, ..., $b_n(q)$]}

FIG. 7
○ HIGHER FEED RATES TEND TO PRODUCE MORE CHATTER.
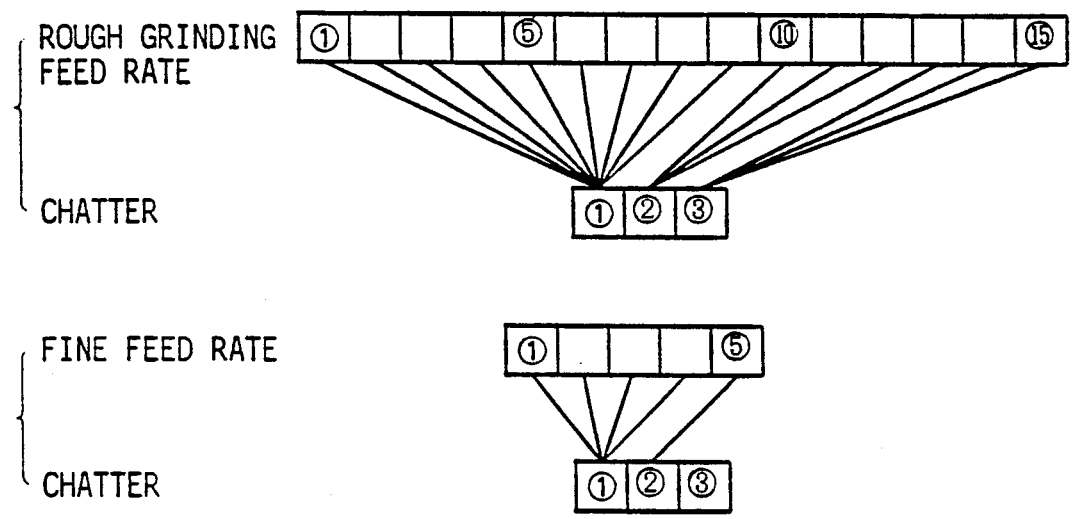
○ LOWER RIGIDITY COEFFICIENTS TEND TO PRODUCE MORE CHATTER.
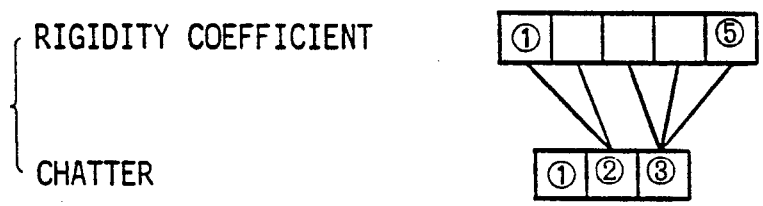
○ HIGHER PERIPHERAL SPEEDS OF WORKPIECE TEND TO GENERATE MORE CHATTER.
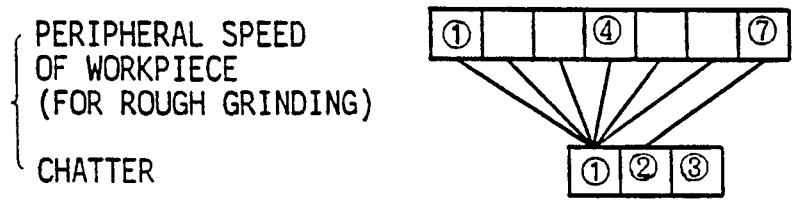
○ HIGHER FEED RATES TEND TO WORSEN ROUNDNESS.

RULE No. 1 {[#2###################][4#######]}

RULE No. 2 {[#####5##############][4#######]}

RULE No. 3 {[########7###########][4#######]}

NEWLY GENERATED RULE {[#2#####7############][4#######]}
{[####################][4#######]}

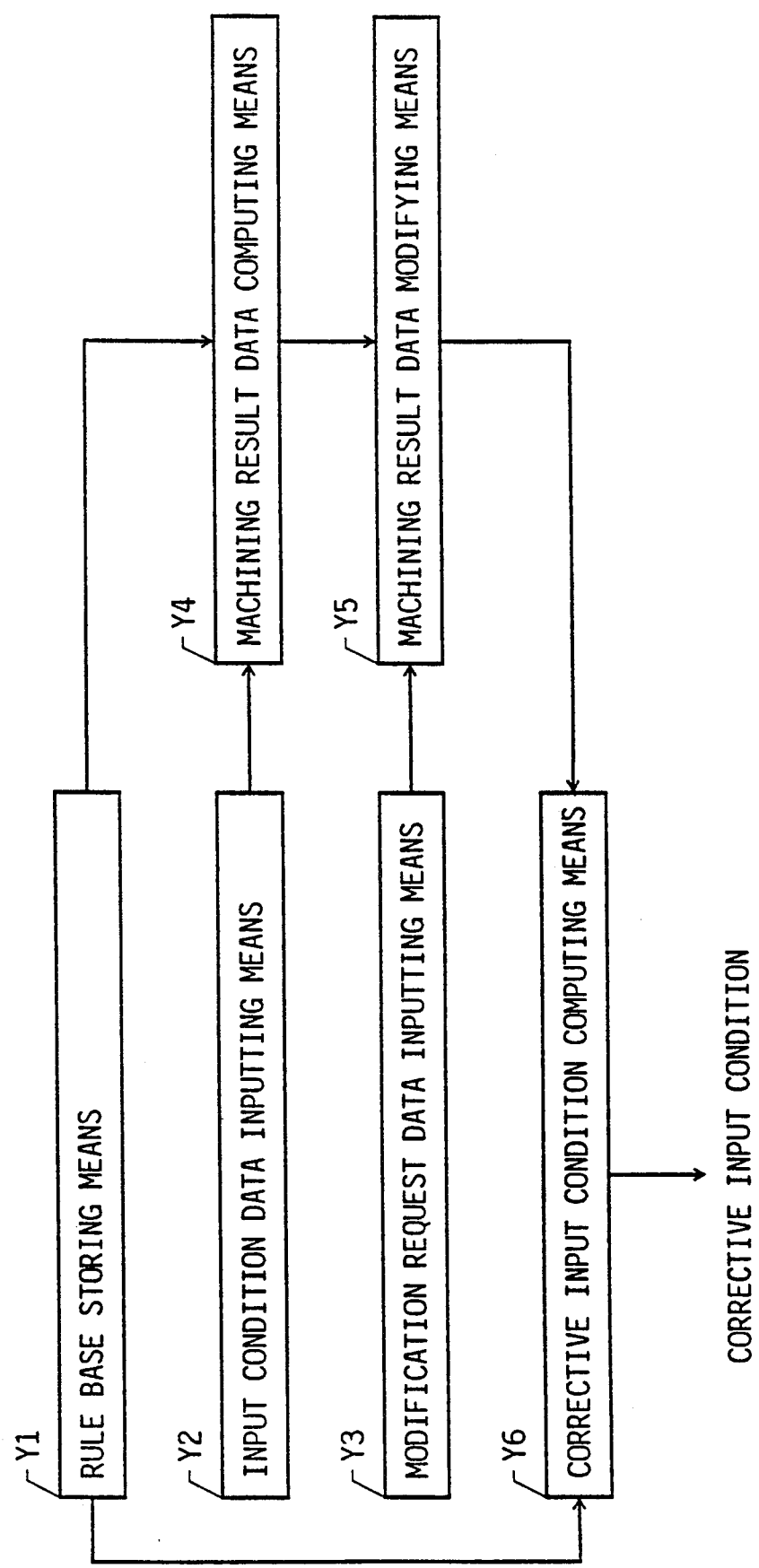

RULE FITNESS DETERMINATION, RULE REMOVAL, AND NEW RULE GENERATION

BACKGROUND OF THE INVENTION

1. Field of the Invention

The present invention relates to a processing apparatus having a rule base which can be used as various processings apparatus such as a numerical controller for a machine tool in which the result of a machining operation is predicted with a rule base.

2. Description of the Prior Art

The rules making up a rule base are generally composed of an antecedent and a consequent each. The antecedent defines the premise for each rule to be met, and the consequent specifies the conclusion in effect when the rule is met. That is, the so-called if-then structure constitutes each rule. A large number of rules of this nature are gathered and combined into a rule base, the individual rules being derived from the empirical and intuitive knowledge of experts in a given field.

The rule base is used to automatically infer desirable conclusions from numerous phenomena that actually take place. The rule base is commonly called a knowledge base, and the apparatus operating on that base to draw conclusions is called a knowledge tool.

It is never easy to construct a rule base. The reason is that, although one conclusion may be readily drawn from one premise, the conclusion from a plurality of premises organically interconnected with one another is never the simple sum of the individual conclusions from the respective premises. Creating rules that interconnect with one another is a difficult task.

A rule base does not necessarily contain all rules that cover every phenomenon and that always allow desirable conclusions to be drawn therefrom. In practice, some rules in the rule base are perceived over time to be irrelevant and new rules are found which need to be added to the base. Thus the rule base is maintained, i.e., reconstructed periodically, by use of the accumulated examples to which the rules have failed to apply.

The examples on which the reconstruction of the rule base is based are accumulated by experts who actually used the base and found it amiss. So far, there is no known apparatus that would automatically generate optimum rules of the data base or update the rules thereof on its own. That is, no apparatus exists which would cause the rule base to evolve by itself.

A rule base is used typically in connection with numerically controlled machine tools. What the rule base does in that application is to predict the result of a given machining operation, and to acquire, where the result of machining needs to be modified, the machining conditions that would provide the modified result of machining as desired.

Machining conditions are calculated and the result of machining is predicted generally as follows. Input condition data are composed of machining condition data (e.g., feed rate) and fixed condition data (e.g., grain size of grinding stone, finish grade of workpiece). Such input condition data are calculated either by human experts or by computer in response to machining specifications for a workpiece to be machined. The result of machining is simulated by computer on the assumption that the workpiece is machined using those input condition data.

Frequently, the simulated result of machining fail to meet desired machining result. In such a case, it is necessary for the expert to further modify the input condition data. Therefore, it is required to repeatedly execute two kinds of operations: operations for obtaining the simulated data on the result of machining, and operations for modifying the input condition data accordingly.

It may happen that the input condition data are already determined, that machining is carried out based on those data, and that it is desired to modify some machining specifications based on the actual result of machining. For example, a slightly improved surface roughness may be desired for the workpiece. In this case, too, it is necessary to repeat the modification of the input condition data and the simulation of the result of machining.

Common to the above cases is the lack of interconnectedness between input condition data and machining result data. When any one item of the machining result data is to be modified, it is difficult to obtain optimum input condition data accordingly all at once.

SUMMARY OF THE INVENTION

It is therefore an object of the present invention to overcome the above-described drawbacks and disadvantages of the prior art and to provide a processing apparatus having a rule base which is capable of optimizing the rule base by allowing it to evolve by itself.

It is another object of the invention to provide a processing apparatus having a rule base that furnishes optimum input condition data all at once in response to the modification of any item in machining result data.

In carrying out the invention and according to one aspect thereof, there is provided, as shown in FIG. 13, a processing apparatus comprising: rule base storing means X1 for storing a plurality of rules made of an antecedent and a consequent each; fitness degree computing means X2 for inputting evaluation values of the result from applying a given rule, the fitness computing means X2 further computing the degree of fitness of the rule in accordance with the accumulated evaluation values; fitness degree storing means X3 for storing the degree of fitness for each rule; selecting means X4 for removing from the rule base storing means X1 the rules having low degrees of fitness so as to leave intact those rules having high degrees of fitness; and rule generating means X5 for selecting any two rules having degrees of fitness higher than the second predetermined value and having the same consequent, the two rules further comprising antecedents each made of a plurality of conditional elements, the rule generating means X5 further exchanging any number of corresponding conditional elements between the two rules in order to generate two new rules.

For example, a plurality of simple rules comprising one premise and one conclusion each are prepared based on the empirical and intuitive knowledge of experts in the field. These rules are combined to constitute an initial rule base.

The initial rule base is applied in practice under various circumstances, and various conclusions are obtained from that practice. Throughout the process, experts evaluate the conclusions to see, illustratively, if the conclusion of a given rule is true or false under a given set of premises. Each rule is evaluated in this manner. With the rules evaluated through their application to diverse actual events, the values derived from the evaluation are accumulated. The accumulated values are used to compute the degree of fitness of the rules reflects how relevant these rules are when put to practice.

After use for a certain period of time, the rule base is updated. The updating involves selecting and dropping rules depending on their degrees of fitness. Rules with degrees of fitness lower than the first predetermined value are removed from the rule base, because they are less than relevant for use in reaching satisfactory conclusions in practice.

Any two rules are selected from the rule base when these rules have degrees of fitness higher than the second predetermined value and sharing the same consequent. What characterizes these two rules is the fact that they have contributed most to attaining the same conclusion. The antecedents of these two rules have a plurality of conditional elements each. Any number of these conditional elements that correspond to one another are exchanged between the two rules. This generates two new rules.

Exchanging the corresponding conditional elements in the antecedents between the two rules most conducive to reaching the same conclusion produces two new rules in a self-evolving manner. These new rules are highly similar to the two old rules and inherit the combined characteristics of the latter. This process of rule generation is highly likely to offer two beneficial new rules which will have high degrees of fitness and which will inherit the combined superior elements (i.e., conditional elements conducive to the conclusion) of their parent rules. The two superior rules will be appreciated in later use for their high degrees of fitness and will be left intact in the subsequent rule base updating process.

On the other hand, two inferior rules may also be generated through inheritance of the inferior conditional elements (i.e., those not conducive to the conclusion) from their parent rules. Because of their low degrees of fitness, these inferior rules will be eventually removed during use from the rule base.

The two old rules are left as they are for the moment in the rule base. Whether these old rules continue to exist or not depends on how high their degrees of fitness will be in subsequent use.

As the rule base are being used and periodically updated in practice, only those superior rules inheriting the superior conditional elements of their parent rules survive. Eventually, the rule base is optimized for the application in question.

The optimized rule base makes it possible not only to infer an optimum conclusion from numerous conditions but also to acquire optimum premises for arriving at a given complex conclusion through backward application of rules.

The fitness degree computing means, selecting means and rule generating means of the invention check each rule for fitness through actual use. Rules are allowed to survive or are removed depending on their degrees of fitness. When the corresponding conditional elements in the antecedents of the two rules most conducive to reaching the same conclusion are exchanged therebetween, two superior rules are produced anew in a self-evolving manner. These superior rules through their subsequent use come to possess high degrees of fitness, surviving during the updating process of the rule base. In this manner, the processing apparatus according to the invention ultimately optimizes the rule base, i.e., creates a collection of the rules having complex conditional elements with enhanced cause-and-effect relationships to complex conclusions.

According to another aspect of the invention, there is provided, as depicted in FIG. 14, a processing apparatus having a rule base for predicting a machining result. The processing apparatus comprises: rule base storing means Y1 for storing a plurality of rules having an antecedent and a consequent each, the antecedent describing input conditions as the premise for a rule to be met, the input conditions including such machining conditions as feed rate and such fixed conditions as finish dimensions of a workpiece, the consequent describing the result of machining as the conclusion in effect when a rule is met; input condition data inputting means Y2 for inputting input condition data with which to machine workpieces; modification request data inputting means Y3 for inputting modification request data with which to designate modification of the result of machining; machining result data computing means Y4 for applying the antecedents of rules in the rule base storing means to the input condition data entered by the input condition data inputting means, the machining result data computing means Y4 further obtaining machining result data based on the consequents of the applied rules; machining result data obtained by the machining result data computing means, in accordance with the modification request data entered by the modification request data inputting means, in order to generate new modified machining result data following the modification; and corrective input condition computing means Y6 for applying the consequents of rules in the rule base storing means to the modified machining result data, the corrective input condition computing means Y6 further computing corrective input condition data in accordance with the antecedents of the applied rules.

There are provided as rules numerous cause-and-effect relationships that apply between input condition data and machining result data. Each rule is described in the if-then format. The if-part, called the antecedent, is a condition part that describes the premise for an input condition. The then-part, called the consequent, is a conclusion part that describes machining result data in effect when the input condition is met.

The input condition data inputting means inputs input condition data. Relevant rules in the rule base are applied to the input condition data thus entered. That is, all rules whose premises are satisfied by the input condition data are extracted. Machining result data are then obtained from the conclusions described by the consequents of these extracted rules.

The machining result data thus obtained are evaluated by experts. Alternatively, workpieces are actually machined using the machining result data, and the machined workpieces are examined for evaluation of the machining result data that were used.

Under these circumstances, there occurs a request for modifying certain machining result data. For example, it is desired to improve a little more the surface roughness of workpieces. The machining result data are modified in accordance with that request.

Relevant rules in the rule base are applied backward to the modified machining result data. That is, all rules whose consequents agree with the modified machining result data are extracted. Corrective input condition data are then computed based on the antecedents of the extracted rules.

As described, the machining result data are obtained by applying "forward" the antecedents of relevant rules in the rule base to the input condition data. The corrective input condition data are readily acquired by applying "backward" appropriate rules in the rule base to the modified machining condition data. Furthermore, when relevant rules of the rule base are applied "forward" to the corrective input condition data, the effects on other machining result data are also predicted.

As described, the processing apparatus according to the invention comprises the machining result data computing means for applying the antecedents of rules in the rule base storing means to the input condition data entered by the input condition data inputting means, the machining result data computing means further obtaining machining result data based on the consequents of the applied rules. The apparatus also comprises the corrective input condition computing means for applying the consequents of rules in the rule base storing means to the modified machining result data, the corrective input condition computing means further computing corrective input condition data in accordance with the antecedents of the applied rules. Such means permit acquisition of the machining result data corresponding to the input condition data. Where the machining condition data are partially or totally modified, the appropriate rules are applied backward so as to obtain corrective input condition data as a whole with ease. The corrective input condition data are used further to predict the result of machining. That is, with any data item in the machining result data modified, the input condition data are corrected accordingly. The corrective input condition data also make it possible to predict the resultant effects on other machining result data.

These and other objects, features and advantages of the invention will become more apparent upon a reading of the following description and appended drawings.

BRIEF DESCRIPTION OF THE DRAWINGS

FIG. 3 is a view listing typical data items of rules for use with the embodiment;

FIG. 4 is a view depicting typical data structures of rules for use with the embodiment;

FIG. 6 is a view showing a typical composition and descriptive format of rules for use with the embodiment;

FIG. 7 is a view depicting typical steps for generating rules for use with the embodiment;

FIG. 14 is a block diagram structurally describing another aspect of the invention.

DETAILED DESCRIPTION OF THE PREFERRED EMBODIMENT

A preferred embodiment of the invention will now be described with reference to the accompanying drawings. This embodiment is an application of the invention to a numerically controlled grinding machine. What the embodiment does includes predicting the result of machining from machining conditions and fixed conditions; modifying machining conditions following modification of certain results of machining; and predicting the result of machining from modified machining conditions.

(1) Structure of grounding machine

Figure 1:
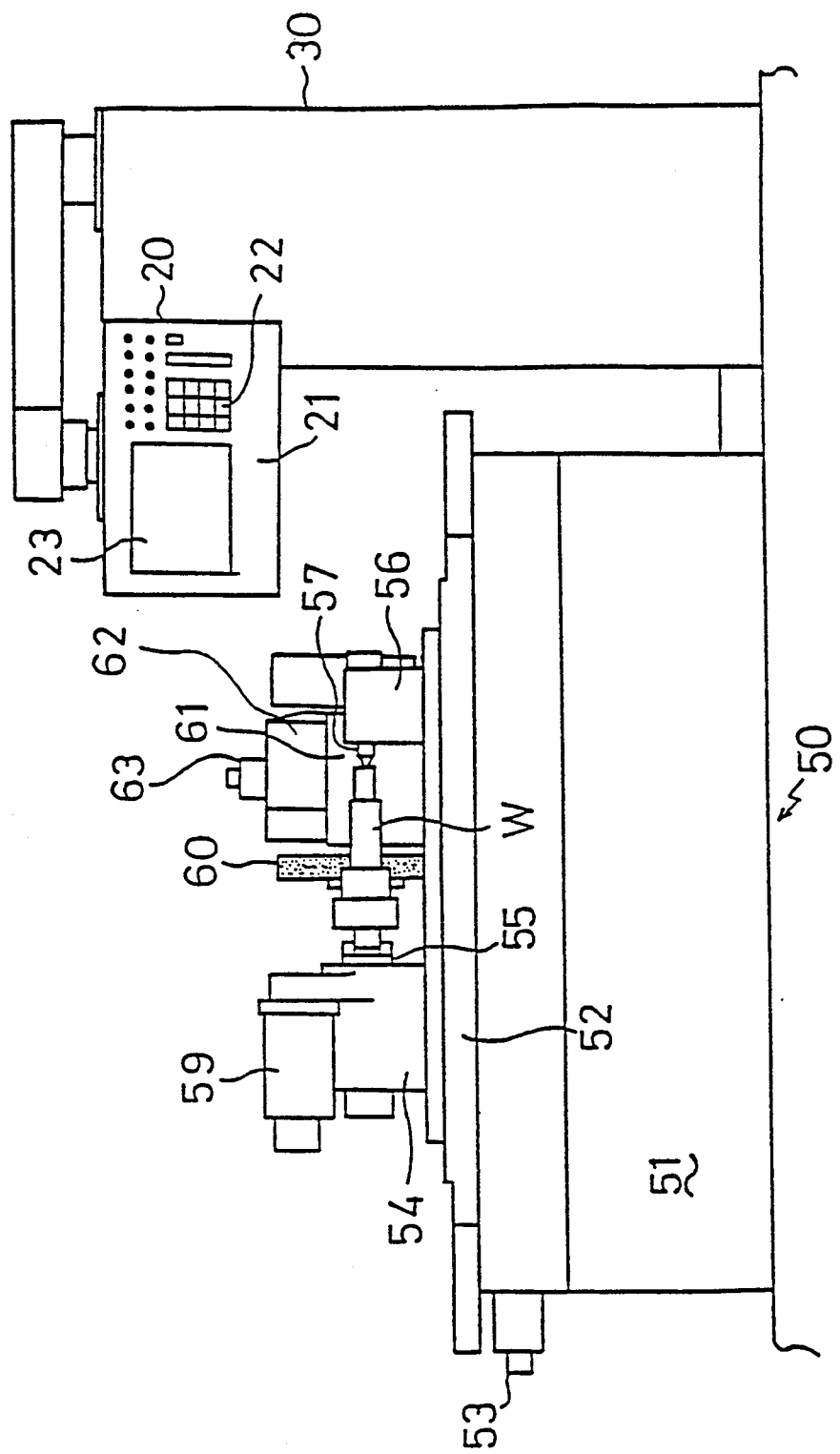
FIG. 1 is a schematic view of a numerically controlled (NC) grinding machine to which is applied a processing apparatus embodying the invention.

FIG. 1 shows the mechanical structure of an NC grinding machine. In FIG. 1, reference numeral 50 is the grinding machine. On a bed 51 of the grinding machine 50 is a table 52 that moves slidingly over the bed. The table 52 moves crosswise in the view, driven by a table feed motor 53. A spindle base 54 and a tail stock 56 are disposed on the table 52. The spindle base 54 has a spindle 55, and the tail stock 56 has a tail spindle 57.

A workpiece W is axially supported by the spindle 55 and the tail spindle 57, and is rotated by the spindle 55. The spindle 55 is rotated by a spindle motor 59 mounted on the spindle base 54.

A grinding wheel 60 is supported on a grinding wheel base 61 and driven by a wheel driving motor 62 through not shown pulleys and a belt. The grinding wheel base 61 is moved vertically in the view by a grinding wheel base feed motor 63. An NC unit 30 is provided to control numerically the table feed motor 53 and grinding wheel feed motor 63. The NC unit 30 constitutes the processing apparatus of this invention.

(2) Construction of NC unit

Figure 2:
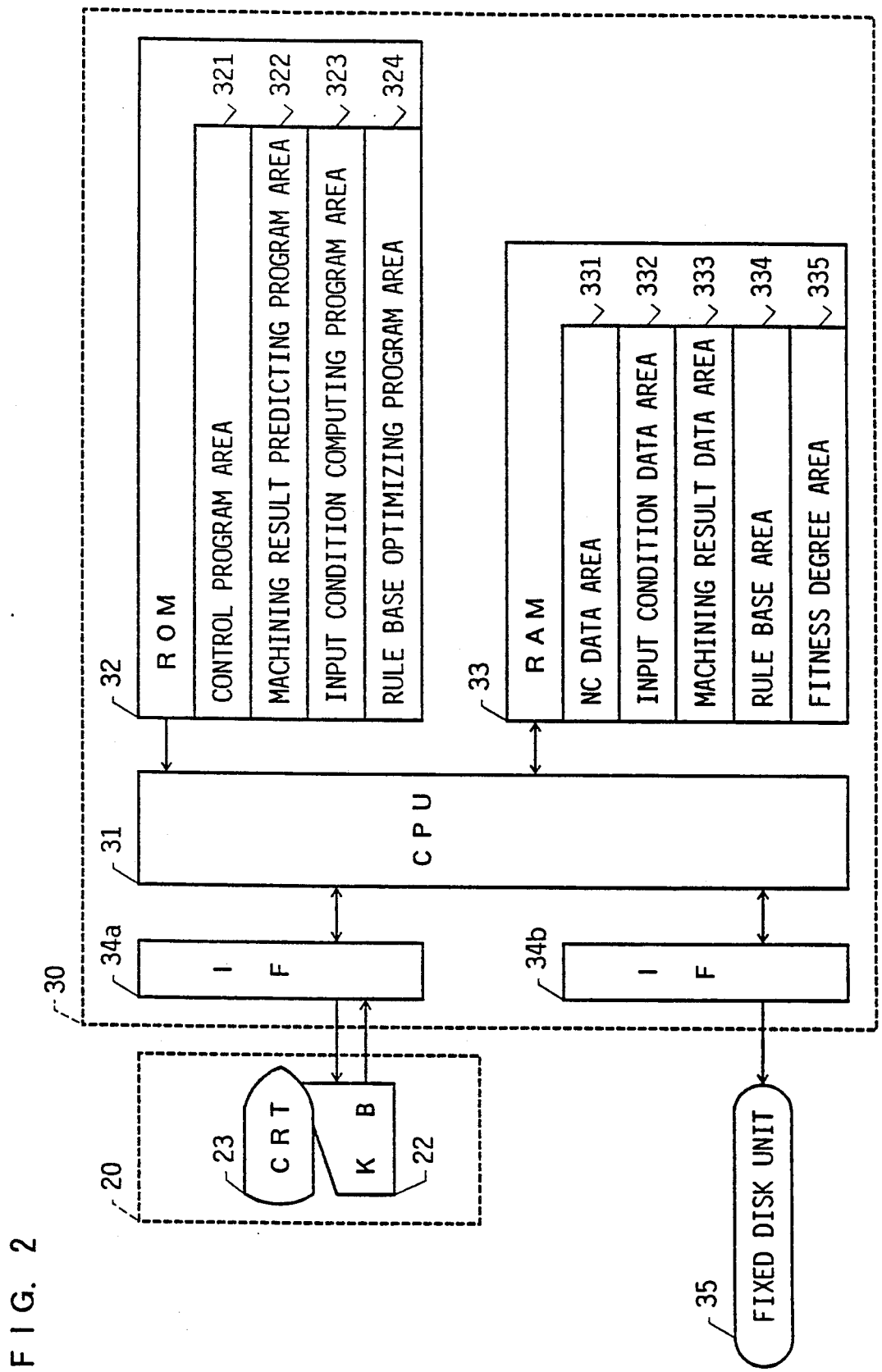
FIG. 2 is a block diagram showing how an NC unit of the embodiment is constructed in conjunction with the NC grinding machine of FIG. 1.

As shown in FIG. 2, the NC unit 30 is primarily composed of a CPU 31, a ROM 32, a RAM 33 and interfaces 34a and 34b.

The RAM 33 comprises an NC data area 331 for storing NC programs; an input condition data area 332 for storing machining condition data and fixed condition data, to be described later; a machining result data area 333 for storing predicted machining result data; a rule base area 334 for storing a rule base; and a fitness degree area 335 for storing the degrees of fitness of the rules making up the rule base.

The RAM 33 is backed up by battery power. The rules stored in the rule base area 334 and the degrees of fitness held in the fitness degree area 335 may be sent to a fixed disk unit 35 via the interface 34b. From the fixed disk unit 35, these data may be placed back into their respective areas in the RAM 33.

The ROM 32 contains a control program area 321 for storing a control program that controls machining in accordance with the NC data held in the NC data area 331; a machining result predicting program area 322 for storing machining result predicting program that predicts machining result data from the input condition data by application of the rule base; an input condition computing program area 323 for storing an input condition data computing program that obtains input condition data in effect when the acquired machining result data are partially modified; and a rule base optimizing program area 324 for storing a program that optimizes the rule base.

(3) Types of data

Machining condition data designate the operating conditions under which the grinding machine is required to finish a workpiece to a desired state. With this embodiment, the machining condition data comprise 11 items ranging from rough grinding rotational speed to post-finish grinding halt time, as shown in FIG. 3.

Fixed condition data are those data that are unchangeable, such as workpiece material, grinding wheel material and finish diameter. With this embodiment, as listed in FIG. 3, the fixed condition data comprise nine items ranging from grinding wheel material to designation of sizing machining. The machining condition data and the fixed condition data constitute input condition data.

Machining result data designate the finished state of the workpiece. With this embodiment, as shown in FIG. 3, the machining result data comprise eight items ranging from surface roughness to vibration.

(4) Rule construction

Rules describe the relationships between input condition data and machining result data. A rule is written in the if-then format, the if-part being the condition of the rule, the then-part being the conclusion in effect when the condition is met. The if-part is called the antecedent and the then-part the consequent.

Rule data are structured as illustrated in FIG. 4. The items of the input condition data and those of the machining result data are assigned in the order given. That is, the data items correspond fixedly to the respective data positions. All data items have the same fixed bit length. With this embodiment, one rule has 28 data items. When the bit length of each data item is set illustratively to 4 bits, the bit length of one rule amounts to 112 bits.

Figure 5:
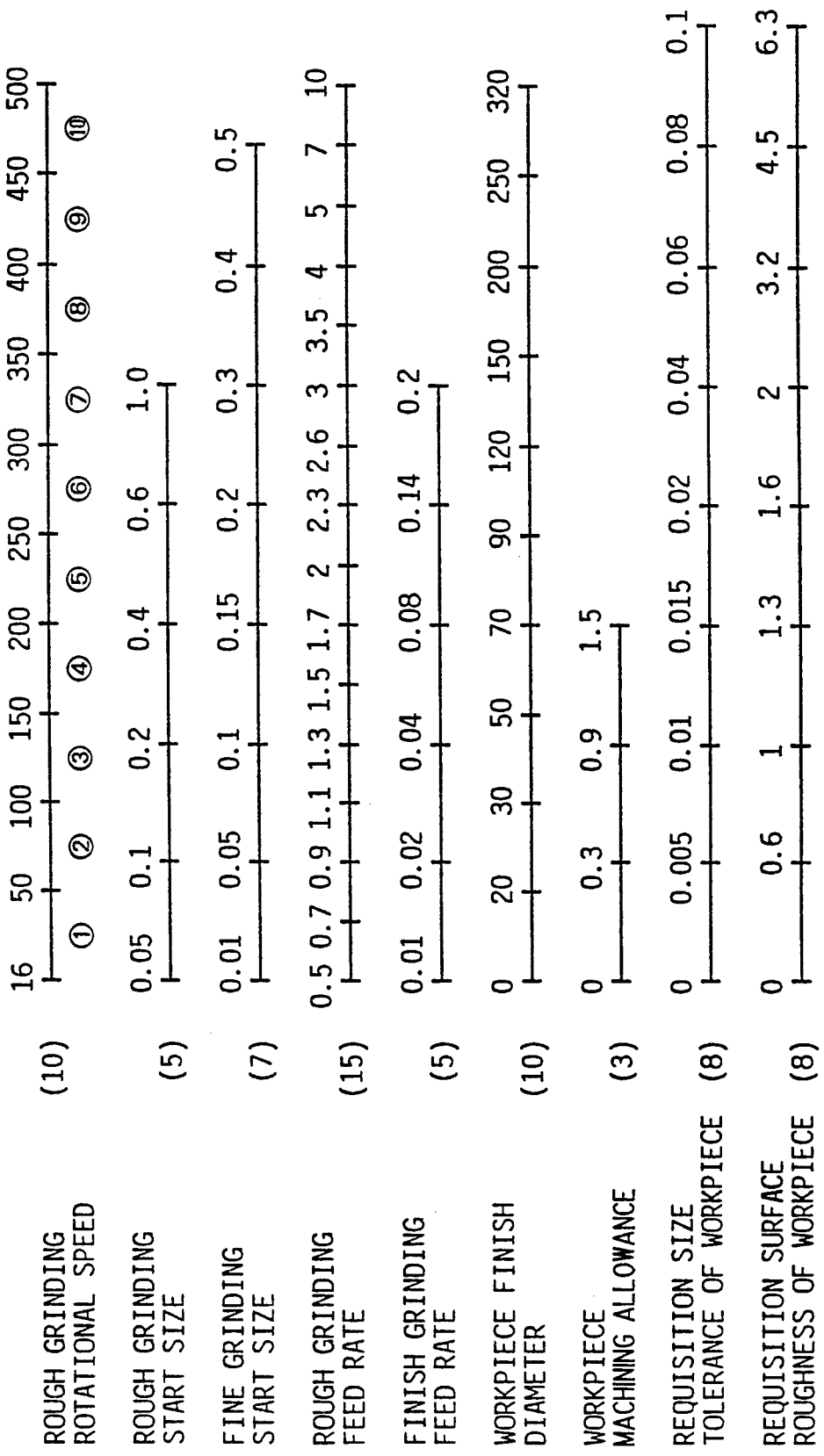
FIG. 5 is a view indicating how the values of each data item are graded for the embodiment.

With each data item constructed in 4 bits, a binary notation "0000" is used to indicate no setting of a value to a given data item. Thus one of up to 15 grades ranging from "0001" (1) to "1111" (15) may be set in a data item. FIG. 5 indicates how the values of various data items are typically graded. As shown, the value of each data item in a rule is represented by a grade of the data. The data items in the antecedent and those in the consequent are connected by logical AND. If no value is set to a given data item, a symbol "#" is provided in its place.

Rules are noted as shown in FIG. 6. In these notations, n stands for the number of rules in a data base; $a_i(j)$ denotes the value (grade) of the i-th data item in the antecedent (input condition data part) of the i-th rule $R_i$; $b_i(j)$ indicates the value (grade) of the j-th data item in the consequent (machining result data part) of the i-th rule $R_i$; p gives the number of data items in the antecedent; and q represents the number of data items in the consequent.

(5) Generation of primary rules

Primary rules are generated as shown in FIG. 7. If, for example, there is a rule of thumb that says, "Higher feed rate tends to produce more chatter," the corresponding relationships between the grades of rough grinding feed rate and the grades of chatter are created with respect to all grades (15 grades) of rough grinding feed rate. This generates 15 rules. One of such rules illustratively says, "If the grade of rough grinding feed rate is 5, then the grade of chatter is 1."

When this rule is written using the structure of FIG. 6, one gets

Rule $R_f$
{[######5##############][###1###
]} since the seventh data item in the antecedent of the rule is "rough grinding feed rate" (see FIG. 4), and the fourth data item in the consequent, "chatter."

Similarly the relationships between fine grinding feed rate and chatter are obtained, and five more rules are generated based on the obtained relationships.

If there is a rule of thumb that says, "Lower workpiece rigidity tends to produce more chatter," the corresponding relationships in grade between workpiece rigidity coefficient and chatter are obtained. This generates five rules corresponding to all grades (5 grades) of workpiece rigidity coefficient. One of such rules says, "If the grade of workpiece rigidity coefficient is 2, then the grade of chatter is 2."

When this rule is written also using the structure of FIG. 6, one gets

Rule $R_w$
{[##############2#####][###2###
]} since the 15th data item in the antecedent is "workpiece rigidity coefficient" (in FIG. 4), and the fourth data item in the consequent, "chatter."

In like manner, rules of the structure shown in FIG. 6 are generated. These rules are stored in the form of a rule base on a fixed disk.

(6) Input condition data given for machining workpiece

When a given workpiece is to be machined, the worker in charge determines the values of all relevant items of input condition data. These input condition data are obtained either through the worker's experience and intuition or through calculations by computer. These values are not grades but "absolute" values. For example, the rough grinding speed is given as 300 rpm. Actually entered input condition data are written hereunder in the format of [D(1)−D(p)], where D(i) stands for the value (grade) of the i-th data item. If there is no need to specify each data item and input condition data need only be generically referred to, the notation thereof is "D."

(7) Application of rules

Where input condition data D are given in practice, the data D are applied in one of two ways: either to predict the result of machining before actual machining of the workpiece, or to machine actually the workpiece. In the former case, the result of machining is predicted using the input condition data D in the steps to be described later. In the latter case, the worker examines the actual result of machining and will want to improve more or less on that result. The worker's requirements for improvement are then input. This gives rise to the need for corrective input condition data that meet such requirements. In this case, too, the corrective input condition data are acquired only after the result of machining is predicted using the initial input condition data D in the steps to be described later.

Figure 8:
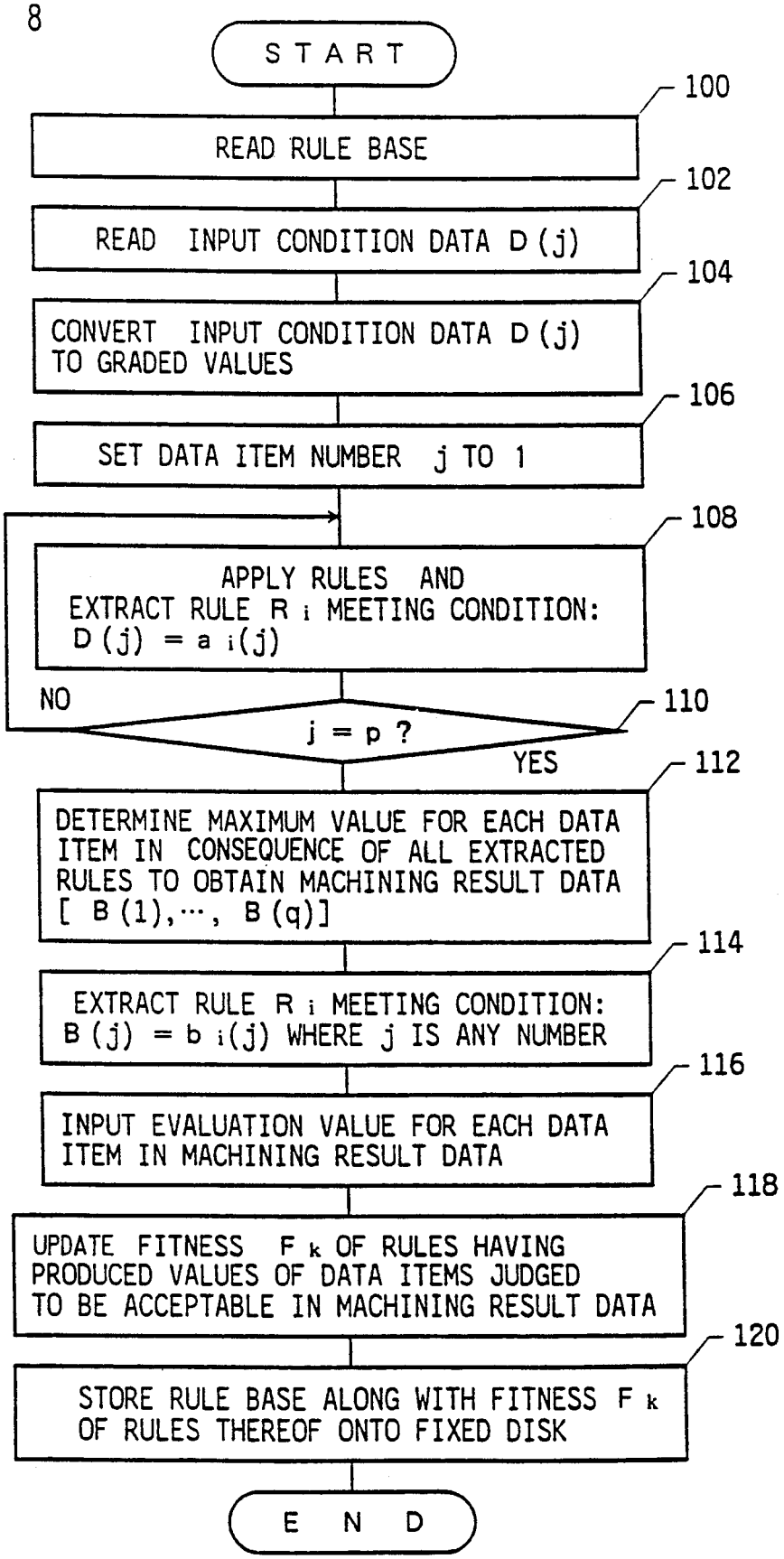
FIG. 8 is a flowchart of steps performed by a CPU of the embodiment in predicting machining result data by use of the rule base.

FIG. 8 is a flowchart of steps constituting the machining result predicting program executed by the CPU 31. This program is stored in the machining result predicting program area 322 of the ROM 32.

In step 100, the rule base and the degrees of fitness of the rules are read out from the fixed disk 35, and are stored in the rule base area 334 and the fitness degree area 335 of the RAM 33.

In step 102, actual input condition data D are read from the input condition data area 332 of the RAM 33. The input condition data have previously input by the worker through a keyboard 22.

In step 104, the input condition data D are converted to grades in the manner shown in FIG. 5. The graded input condition data are also stored in the input condition data area 332 in the form of [D(1)−D(p)].

In step 106, the data item number j is initialized to 1.

In step 108, all rules stored in the rule base area 334 are applied to the input condition data D. That is, all rules that meet the condition $$D(1)=a_i(1)$$

are extracted by comparing the values of the first data item in the input condition data and the first data items in the antecedents of the rules.

In step 110, it is judged whether or not application of the rules to all data items of the input condition data has been completed. If the rule application to all data items is not completed, step 108 is reached again and repeated. This allows all rules meeting the condition $$D(j)=a_i(j)$$

to be extracted by comparing the j-th data item in the input condition data and the j-th data items in the antecedents of the rules.

With all relevant rules extracted, step 112 is reached. In step 112, the maximum value (grade) of every data item is obtained in the consequents of all rules extracted in step 108. The set of these values constitutes predicted machining result data [B(1), ..., B(q)]. Where machining result data are to be generically referred to, the notation thereof is "B."

If the workpiece is machined using the actual input condition data D prepared by the worker, it is expected at the current stage that the finished state of the workpiece becomes the state indicated by the machining result data B.

In step 114, of all rules extracted in step 108, those rules sharing the same value with a given data item in the machining result data B are selected. That is, for each data item, the rule that meets the condition $$B(j)=b_i(j)$$

is selected. The selected rule is a rule that has generated the value B(j) of the j-th data item in the machining result data.

In step 116, each data item in the machining result data B is evaluated according to the worker's empirical knowledge or based on the finished state of the workpiece actually machined using the input condition data D. If the value of each data item in the machining result data B is acceptable, the result of evaluation is good or "1" in binary notation; if that value is not acceptable, the result of evaluation is no good or "0." Either "1" or "0" is given upon evaluation of each data item in the machining result data B.

In step 118, the degree of fitness $F_k$ of the rule $R_k$ is updated, the rule $R_k$ having produced the value B(m) of each data item judged to be acceptable in the machining result data.

The initial value of fitness for all rules is 0. The degree of fitness for each rule is updated as follows. Suppose that the rule to be updated in fitness is Rule
$R_k\{[\#\#\#\#\#\#\#\#\#\#\#\#\#\#2\#\#\#\#\#][\#1\#2\#\#\#3]\}$ and that the second and the eighth data items are judged to be acceptable in the consequent thereof. In that case, the number of the acceptable data items (i.e., 2) is added to the current degree of fitness $F_k$ ($F_k=F_k+2$).

This means that a rule having more acceptable data items is judged to possess a correspondingly higher degree of fitness with respect to the input condition data D. On the other hand, a rule containing no acceptable data items is deemed to have only a low degree of fitness and is not updated in terms of fitness.

In step 120, the rule base held in the rule base area 334 and the degrees of fitness of the rules making up the rule base are output to the fixed disk for storage therein.

(8) Modification of input condition data

The worker reviews the machining result data B obtained as described in the preceding section (7) on the application of rules. As a result, the worker may want to improve the machining result. For example, where the current grade of surface roughness in the obtained machining result data B is 7, it may be desired to improve the surface roughness by 3 so that the workpiece will be finished with a surface roughness of 4. In that case, it is necessary to obtain the input condition data for achieving the surface roughness of 4.

In another case, having reviewed the workpiece actually machined using the input condition data D, the worker may want to improve a certain item of the machining result. For example, although the exact grade of surface roughness may not be known for the moment, it may be desired to improve the currently attained surface roughness by another 3 in grade. In this case, it is necessary to obtain the corrective input condition data for improving the property by a grade of 3 relative to the current grade.

In such cases, the CPU 31 carries out the input condition computing program stored in the input condition computing program area 323 of the ROM 32. This program is made up of the steps shown in FIG. 9.

Figure 9:
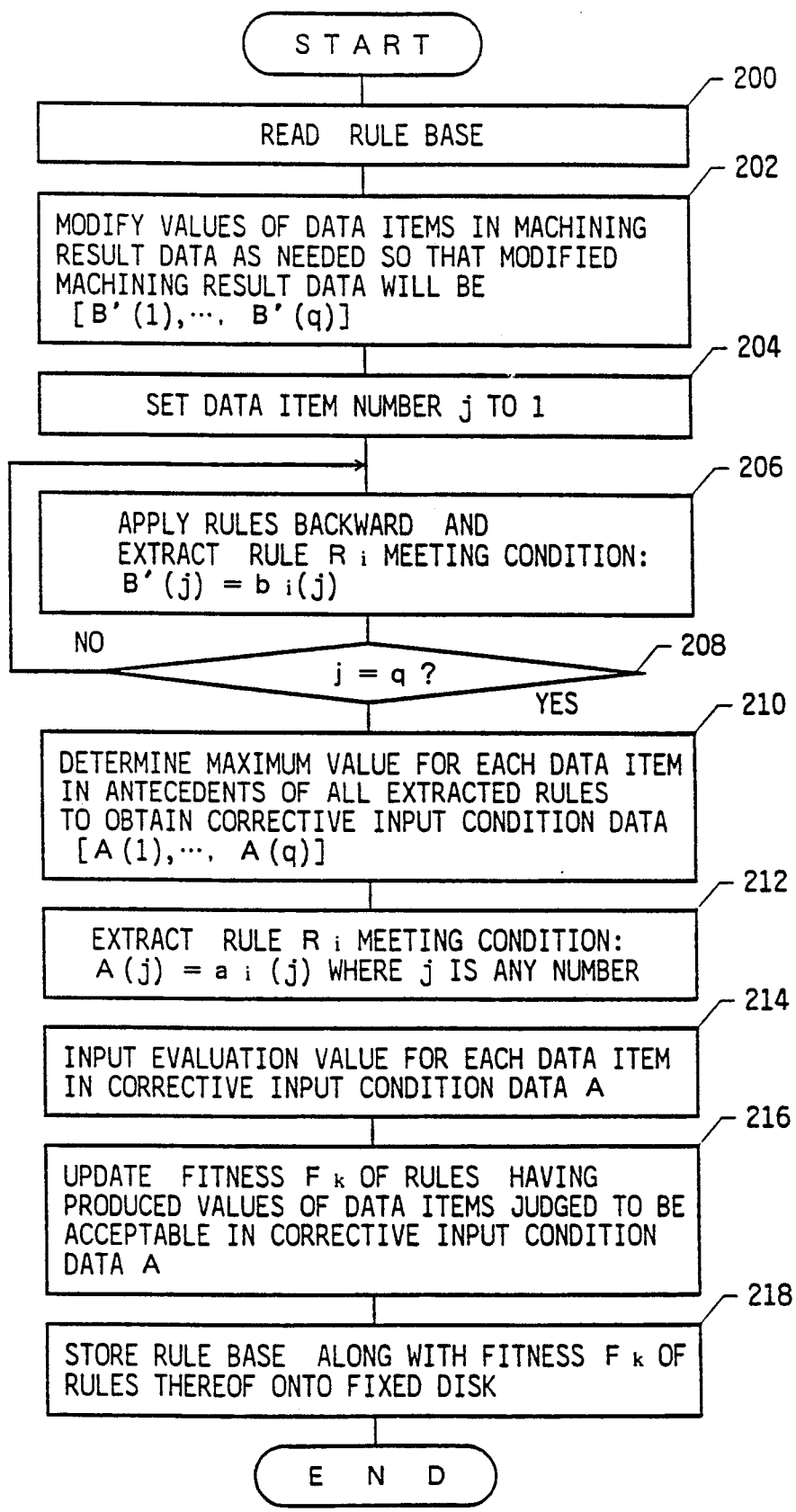
FIG. 9 is a flowchart of steps carried out by the CPU in computing input condition data from modified machining result data by use of the rule base.

In step 200 of FIG. 9, the rule base and the degrees of fitness of the rules making up the rule base are read from the fixed disk unit 35 and are stored into the rule base area 334 and the fitness degree area 335, respectively.

In step 202, the value of the desired data item in the machining result data B is modified as designated by the worker. The modified machining result data turn out to be:

$$[B'(1), \ldots, B'(q)]$$

The modified machining result data are generically referred to as B'. As indicated, machining result data are modified by the worker in two stages: to designate the data item to be modified, and to input the grade H of the relative modification amount for that data item. The modified machining result data B' are computed by use of the machining result data B and the relative grade H.

In step 204, the data item number j is initialized to 1.

In step 206, all rules held in the rule base area 334 are applied backward to the modified machining result data B'. That is, all rules that meet the condition $$B'(1) = b_i(1)$$

are extracted by comparing the values of the first data item in the modified machining result data and the first data items in the consequents of the rules.

In step 208, it is judged whether or not application of the rules to all data items of the modified machining result data B' has been completed. If the rule application to all data items is not completed, step 206 is reached again and repeated. This allows all rules meeting the condition $$B'(j) = b_i(j)$$

to be extracted by comparing the j-th data item in the modified machining result data B' data and the j-th data items in the consequents of the rules.

With all relevant rules extracted, step 210 is reached. In step 210, the maximum value (grade) of every data item is obtained in the antecedents of all rules extracted in step 206. The set of these values constitutes corrective input condition data [A(1), ..., A(q)]. Where the corrective input condition data are to be generically referred to, the notation thereof is "A." Thus the corrective input condition data A are obtained which are needed to acquire the modified machining result data B'.

In step 212, of all rules extracted in step 206, those rules sharing the same value with a given data item in the corrective input condition data A are selected. That is, for each data item, the rule that meets the condition $$A(j) = a_i(j)$$

is selected. The selected rule is a rule that has generated the value A(j) of the j-th data item in the corrective input condition data A.

The corrective input condition data [A(1), ..., A(q)] may not be necessarily determined for all data items. That is, there may remain some data items for which the antecedent of any rule extracted in step 206 has a data item with no grade set thereto. In such a case, that data item in the input condition data is not determined by the rules; the data item takes on the value of the corresponding data item in the initial input condition data D.

In step 214, each data item in the corrective input condition data A is evaluated according to the worker's empirical knowledge or based on the finished state of the workpiece actually machined using the corrective input condition data A. If the value of a given data item in the corrective input condition data A is acceptable, the result of evaluation is good or "1" in binary notation; if that value is not acceptable, the result of evaluation is no good or "0." Either "1" or "0" is set to each data item upon evaluation.

In step 216, the degree of fitness $F_k$ of the rule $R_k$ is updated, the rule $R_k$ having produced the value A(m) of each data item judged to be acceptable in the corrective input condition data.

The degree of fitness for each rule is updated as follows. Suppose that the rule to be updated in fitness is Rule
$R_k\{[\#2\#\#4\#\#5\#\#\#\#\#\#2\#\#\#\#\#][4\#\#\#\#\#\#\#]\}$ and that the second, the fifth and the 15th data items are judged to be acceptable in the antecedent thereof. In that case, the number of the acceptable data items (i.e., 3) in the antecedents is added to the current degree of fitness $F_k$ ($F_k = F_k + 3$).

This means that a rule having a larger number of acceptable data items is judged to possess a correspondingly higher degree of fitness. On the other hand, a rule containing no acceptable data items is deemed to have only a low degree of fitness and is not updated in terms of fitness.

In step 214, the rule base held in the rule base area 334 and the degrees of fitness of the rules making up the rule base are output to the fixed disk unit 35 for storage therein.

(9) Prediction of effects on machining result

The rule base is applied in accordance with the steps of FIG. 8 using the corrective input condition data [A(1), ..., A(q)] in place of the input condition data [D(1), ..., D(q)]. This provides machining result data [B"(1), ..., B"(q)] in effect on the assumption that the workpiece is machined using the corrective input condition data [A(1), ..., A(q)]. In this manner, it is possible to predict how the other properties of the machining result are affected if the workpiece is machined using the corrective input condition data. Reviewing the machining result data B", the worker may add further modifications if necessary.

(10) Learning of rule base

Figure 10:
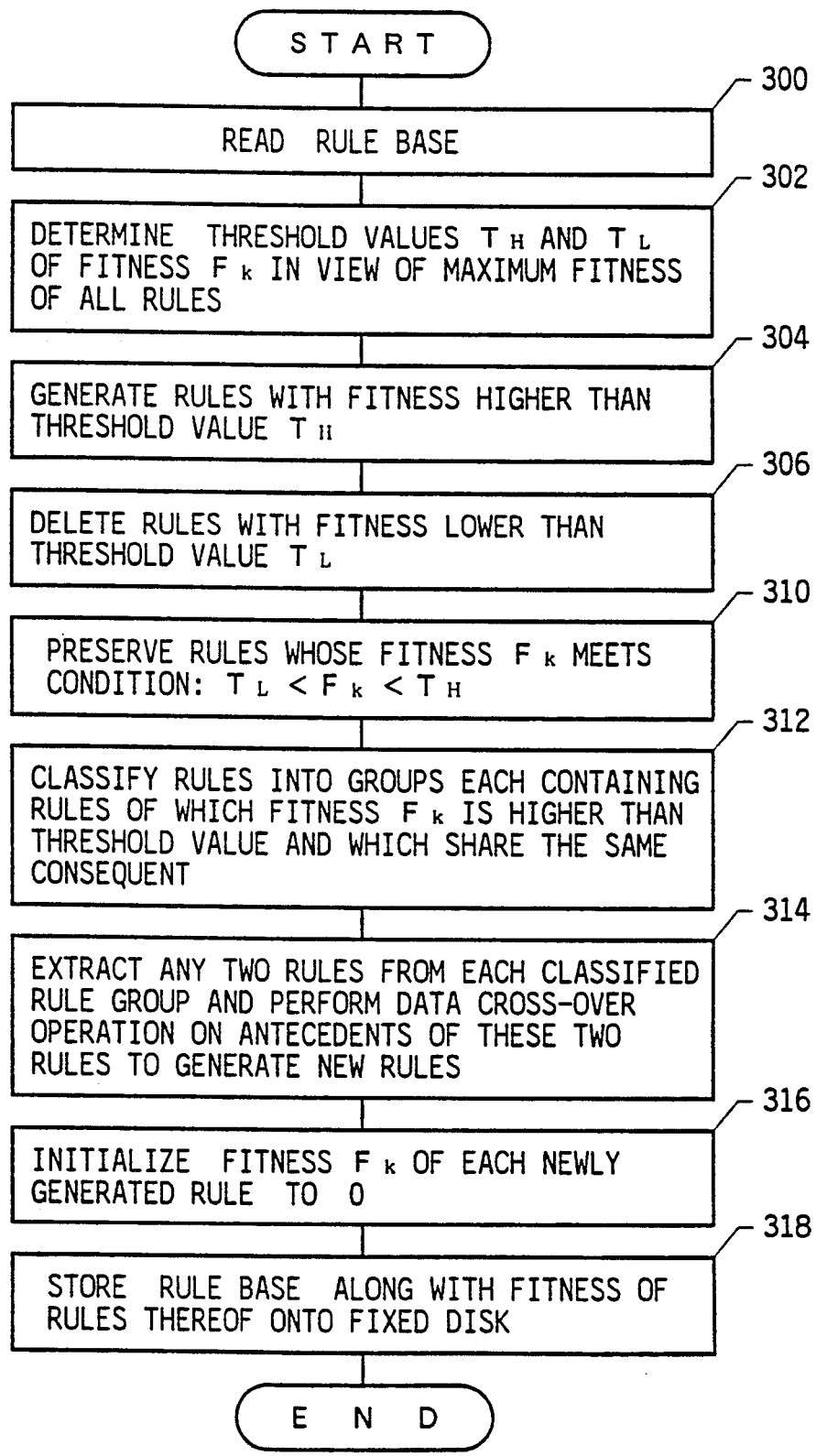
FIG. 10 is a flowchart of steps conducted by the CPU in updating the rule base.

Described below are the steps to optimize the rule base when it needs to be updated. FIG. 10 is a flowchart of the steps constituting the rule base optimizing program stored in the rule base optimizing program area 324 in the ROM 32. The program is executed by the CPU 31.

In step 300, the rule base and the degrees of fitness of the rules making up the rule base are read from the fixed disk unit 35 and are stored into the rule base area 334 and the fitness degree area 335, respectively.

In step 302, an upper threshold value $T_H$ and a lower threshold value $T_L$ of rule fitness are determined in view of the maximum degree of fitness $F_k$ for all rules.

In step 304, the rules with their fitness $F_k$ higher than the threshold value $T_H$ are extracted. For each of the extracted rules, a number of rules which are the same as original rule are generated. The number of rules corresponds to the degree of fitness of each extracted rule. The degrees of fitness of the newly generated rules are the same as those of the original rules.

In step 306, the rules with their fitness $F_k$ lower than the threshold value $T_L$ are deleted.

In step 310, the rules with their fitness $F_k$ between the threshold values $T_L$ and $T_H$ are left as they are.

Overall, the steps above leave intact the rules with high degrees of fitness and delete the rules with low degrees of fitness. That is, the rules with low degrees of fitness do not contribute to achieving desirable results and are thus eliminated from the rule base; the rules with high degrees of fitness are conducive to attaining desirable results and are thus preserved when the rule base is updated. Because a plurality of the same rules are generated with high degrees of fitness, the rules to be generated by data cross-over operations in subsequent steps are more likely to be those rules associated with the numerous same rules. This shortens the time required for the rule base to be optimized.

In step 312, all rules are classified into groups. Each of these groups is comprised of rules with their fitness higher than a given threshold value. In each group, the value of each corresponding data item in the consequents of the component rules is the same. That is, all rules are classified according to the value of each item in the consequents thereof.

Figures 11, 12, 13:
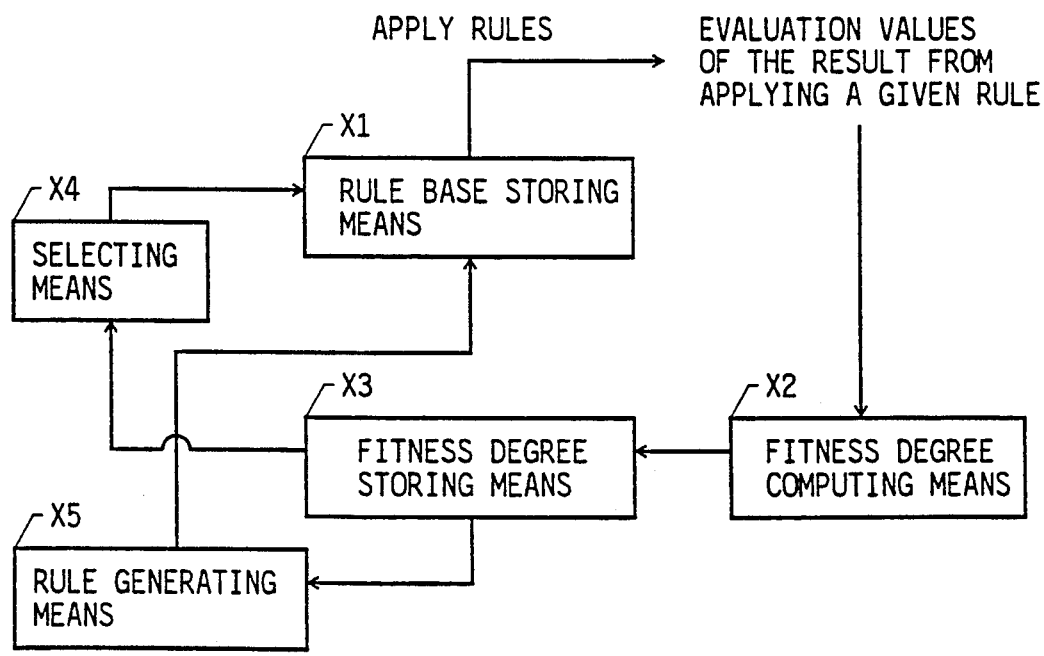
FIG. 11 is a view illustrating how new rules are generated by a cross-over operation during the updating of the rule base.
FIG. 12 is a view showing typical new rules generated by the cross-over operation.
FIG. 13 is a block diagram structurally describing one aspect of the invention.

For example, one group of rules having a value of 4 in the first data item of their consequents is constructed as shown in FIG. 11. Two new rules, illustratively rule No. 1 and rule No. 3, are extracted from this rule group. The data items in the antecedent of each of these two extracted rules are divided in two anywhere between the leftmost value-loaded data item (second data item of rule No. 1) and the rightmost value-loaded data item (eighth data item in rule No. 3). Illustratively, the left-hand data item group ranges from the first item to the fifth, and the right-hand data item group starts from the sixth item to the twentieth. In the left-hand data item groups of the two extracted rules are exchanged therebetween. This generates two new rules.

In the example of FIG. 11, rules No. 1 and No. 3 exchange their data items to produce two new rules shown in FIG. 12. If none of the data items in the antecedent of one of the two new rules contain any specific values, that rule is deleted. Thus a new rule is generated which has values in the second and the eight data items in the antecedent. The degree of fitness for the newly generated rule is initialized to 0 in step 316.

New rules are generated by varying rule-generating requirements, e.g., by changing the position to divide data items into two groups, or by randomly selecting two rules to generate new rules. The process is repeated suitably to generate numerous new rules. Each new rule obtained in this manner inherits the properties of its two parent rules.

In step 318, the updated rule base and the new degrees of fitness of the new rules making it up are sent to the fixed disk unit 35 for storage therein. The updated rule base is then utilized, as shown in FIGS. 8 and 9, to compute machining result data, to calculate corrective input condition data, and to predict the consequential effects of corrective input condition data on the result of machining. Throughout the process, the fitness of each rule is updated. When it is time for the data base to be again updated, the steps of FIG. 10 are carried out.

The above updating process is repeated until the data base is ultimately optimized. The optimized rule base is ideally a rule base where the respective rule would optimize the graded values of all data items in the input condition data affecting the grade of each data item in the consequent of the rule.

As described, data are exchanged between two given rules so that new rules highly similar to the parent rules and having properties of the parent rules will be generated in a self-evolving manner. In such rule generation, it is probable that rules having sufficiently high degrees of fitness and inheriting the superior properties of their parent rules (i.e., conditional elements having high cause-and-effect relationships with the conclusion) will be generated. The superior rules inheriting the superior properties of their parent rules are appreciated later for their high degrees of fitness in practical use, and thus survive the subsequent updating process. Also generated are inferior rules that inherit the inferior properties of their parent rules (i.e., conditional elements with low cause-and-effect relationships with the conclusion). These inferior rules turn out in subsequent use to be low in fitness; they are eventually deleted from the rule base.

As described and according to the invention, the processing apparatus allows the rules making up a rule base to multiply, to differentiate and to evolve on their own until the rule base is optimized. There is no need for the worker to add new rules to the data base for optimizing purposes.

An alternative way for the above embodiment to generate new rules is to modify the values of desired data items in any rules. The need for this alternative is as follows: Generation of new rules based on the data cross-over operation is characterized by partial inheritance of the properties of two parent rules. Because the properties of the rules do not vary considerably, optimizing state of the rule base may be dropped into a local minimal point of energy during the rule updating process. In such a case, the values of desired data items may be randomly changed so as to create intentionally some states of disturbance or rule mutations during the process. By such a process the optimizing state of the rule base can escape from the local minimal point of energy and can reach a minimum point of energy. The rule base is optimized in this manner as well.

With the above embodiment, the rule base storing means X1 comprises the fixed disk unit 35 and the rule base area 334 in the RAM 33. The fitness computing means X2 is composed of the CPU 31, steps 114 through 118 in FIG. 8 and steps 212 through 216 in FIG. 9, all steps being executed by the CPU 31. The fitness degree storing means X3 is made up of the fitness degree area 335 in the RAM 33 and the fixed disk unit 35. The selecting means X4 is constituted by the CPU 31 and by steps 302 through 310 of FIG. 10 carried out by the CPU 31. The rule generating means X5 is comprised of the CPU 31 and steps 312 through 316 of FIG. 10 performed by the CPU 31.

The rule base storing means Y1 contains the fixed disk unit 35 and the rule base area 335 in the RAM 33. The input condition data inputting means Y2 is composed of the keyboard 22, the input condition data area 332 in the RAM 33, the CPU 31, and steps 102 through 104 of FIG. 8 executed by the CPU 31. The modification request data inputting means Y3 is implemented by use of the keyboard 22, the CPU 31, and step 202 of FIG. 9 carried out by the CPU 31. The machining result data computing means Y4 is made up of the machining result predicting program area 322 in the ROM 32, the CPU 31, and steps 108 through 112 of FIG. 8 performed by the CPU 31. The machining result data modifying means Y5 is constituted by the CPU 31 and by step 202 of FIG. 9 executed by the CPU 31. The corrective input condition data computing means Y6 comprises the input condition computing program area 323 in the ROM 32, the CPU 31, and steps 206 through 210 of FIG. 9 carried out by the CPU 31.

While a preferred embodiment of the invention has been described using specific terms, such description is for illustrative purposes only, and it is to be understood that changes and variations may be made without departing from the spirit or scope of the following claims.

What is claimed is:

1. A processing apparatus comprising:
   rule base storing means for storing a plurality of rules each made of an antecedent and a consequent, said antecedent describing a premise to be met, said consequent describing a conclusion in effect when a rule is met;

fitness degree computing means for inputting evaluation values of a result obtained by applying said rules stored in said rule base storing means, and computing degrees of fitness of said rules in accordance with said evaluation values;

selecting means for removing from said rule base storing means a rule having degree of fitness lower than a first predetermined value; and rule generating means for selecting any two rules in said rule base storing means, said two selected rules having degrees of fitness higher than a second predetermined value and having a same consequent, said rule generating means further generating at least one new rule by combining the antecedents of said two selected rules.

2. A processing apparatus according to claim 1, wherein the antecedent of each of said rules is made of a plurality of condition elements, and said rule generating means exchanges any number of corresponding conditional elements between said two selected rules in order to generate two new rules.

3. A processing apparatus according to claim 7, further comprising new rule generating means for selecting any one rule from said rules in said rule base storing means so as to change a value of any one of said conditional elements constituting said antecedent of said selected rule to any value, whereby a new rule is generated.

4. A processing apparatus according to claim 7, wherein said antecedent and said consequent of each of said rules store in said rule base storing means are each composed of a string of graded values indicating values of conditional elements, each of names of said conditional elements being represented by a location thereof within said string.

5. A method of optimizing a rule base of a processing apparatus, said method comprising the steps of:

storing in the form of a rule base a plurality of rules each made of an antecedent and a consequent, said antecedent describing a premise to be met, said consequent describing a conclusion in effect when a rule is met;

inputting evaluation values of a result obtained by applying said rules of said rule base in order to compute degrees of fitness of said rules in accordance with said evaluation values;

removing from said rule base rules having degrees of fitness lower than a first predetermined value; and selecting any two rules in said rule base, said two rules having degrees of fitness higher than a second predetermined value and having a same consequent, said two rules further comprising antecedents each made of a plurality of conditional elements, wherein any number of corresponding conditional elements are exchanged between said two rules in order to generate two new rules.

* * * * *